(12) United States Patent
Komatireddi et al.

(10) Patent No.: US 12,694,505 B2
(45) Date of Patent: Jul. 28, 2026

(54) PRE-BONDING AUTOMATIC OPTICAL INSPECTION DEFECT CLASSIFICATION

(71) Applicant: Applied Materials, Inc., Santa Clara, CA (US)

(72) Inventors: Rahul Reddy Komatireddi, Bangalore (IN); Rohith Cherikkallil, Bangalore (IN); Sneha Rupa Kongara, Bangalore (IN); Satwik Swarup Mishra, Bengaluru (IN); Sachin Dangayach, San Jose, CA (US); Si En Chan, Singapore (SG); Remus Zhen Hui Koh, Singapore (SG); Prayudi Lianto, Singapore (SG); Yin Wei Lim, Singapore (SG); Peng Suo, Singapore (SG); Krishnaprasad Reddy Mallavaram, Bangalore (IN); Khor Wui Cheng, Singapore (SG)

(73) Assignee: APPLIED MATERIALS, INC., Santa Clara, CA (US)

( * ) Notice: Subject to any disclaimer, the term of this patent is extended or adjusted under 35 U.S.C. 154(b) by 659 days.

(21) Appl. No.: 18/128,491

(22) Filed: Mar. 30, 2023

(65) Prior Publication Data

US 2024/0331131 A1 Oct. 3, 2024

(51) Int. Cl.
G06T 7/00 (2017.01)
G06T 7/13 (2017.01)

(52) U.S. Cl.
CPC ................ G06T 7/001 (2013.01); G06T 7/13 (2017.01); G06T 2207/20081 (2013.01); G06T 2207/20084 (2013.01); G06T 2207/30148 (2013.01)

(58) Field of Classification Search
CPC . G06T 7/001; G06T 7/13; G06T 2207/20081; G06T 2207/20084; G06T 2207/30148; G06T 7/0004
See application file for complete search history.

(56) References Cited

U.S. PATENT DOCUMENTS 6,407,373 B1 6/2002 Dotan
7,987,150 B1 7/2011 Luu et al.
(Continued)

FOREIGN PATENT DOCUMENTS

CN 102136061 A * 7/2011
KR 10-1561778 B1 10/2015
(Continued)

OTHER PUBLICATIONS

CN 102136061 to Qiu et al (Year: 2011).*
(Continued)

*Primary Examiner* — Christopher Wait
(74) *Attorney, Agent, or Firm* — Moser Taboada

(57) ABSTRACT

A method, apparatus and system for the automatic detection and measurement of chipping defects on diced wafers includes receiving an image of at least a portion of a diced wafer, aligning the received image of the at least the portion of the diced wafer, determining edges of the at least the portion of the diced wafer depicted in the aligned, received image, automatically determining at least one baseline from which to measure chipping defects on the at least the portion of the diced wafer from the determined edges, and measuring chipping defects on the at least the portion of the diced wafer using at least one determined, respective baseline. In some embodiments, the method, apparatus and system can further include applying a machine learning model to measured chipping defects to determine if a critical failure exists on the diced wafer.

17 Claims, 6 Drawing Sheets

(56) References Cited

U.S. PATENT DOCUMENTS

| | | | |
|---|---|---|---|
| 2004/0120569 A1 | 6/2004 | Hung et al. | |
| 2016/0125583 A1 | 5/2016 | Amanullah et al. | |
| 2019/0067060 A1 | 2/2019 | Plihal et al. | |
| 2019/0073568 A1 | 3/2019 | He et al. | |
| 2021/0150688 A1 | 5/2021 | Bidault | |
| 2021/0201460 A1 | 7/2021 | Gong et al. | |
| 2021/0209410 A1 | 7/2021 | Pan et al. | |
| 2022/0108436 A1* | 4/2022 | Kang | G06T 7/0006 |
| 2023/0054119 A1 | 2/2023 | Pai et al. | |
| 2023/0069493 A1 | 3/2023 | Kim et al. | |
| 2023/0385502 A1 | 11/2023 | Chou et al. | |
| 2024/0202908 A1 | 6/2024 | Rundo et al. | |

FOREIGN PATENT DOCUMENTS

| | | |
|---|---|---|
| KR | 10-2019-0134275 A | 12/2019 |
| WO | WO 2019-129160 A1 | 7/2019 |
| WO | WO 2021-166161 A1 | 8/2021 |

OTHER PUBLICATIONS

Wooksoo Shin et al., Mixup-based classification of mixed-type defect patterns in wafer bin maps, Computers & Industrial Engineering. vol. 167, Article No. 107996, Feb. 5, 2022.

International Search Report for PCT/US2024/012766, dated May 17, 2024.

International Search Report for PCT/US2024/012764, dated May 17, 2024.

International Search Report for PCT/US2024/012761, dated May 21, 2024.

Cheon, Sejune, et al. "Convolutional neural network for wafer surface defect classification and the detection of unknown defect class." IEEE Transactions on Semiconductor Manufacturing 32.2 (2019): 163-170. (Year: 2019).

Chien, Jong-Chih, Ming-Tao Wu, and Jiann-Der Lee. "Inspection and classification of semiconductor wafer surface defects using CNN deep learning networks." Applied Sciences 10.15 (2020): 5340. (Year: 2020).

Phua, Charissa, and Lau Bee Theng. "Semiconductor wafer surface: Automatic defect classification with deep CNN." 2020 IEEE region 10 conference (Tencon). IEEE, 2020. (Year: 2020).

* cited by examiner 202                     204

302         304         306

500

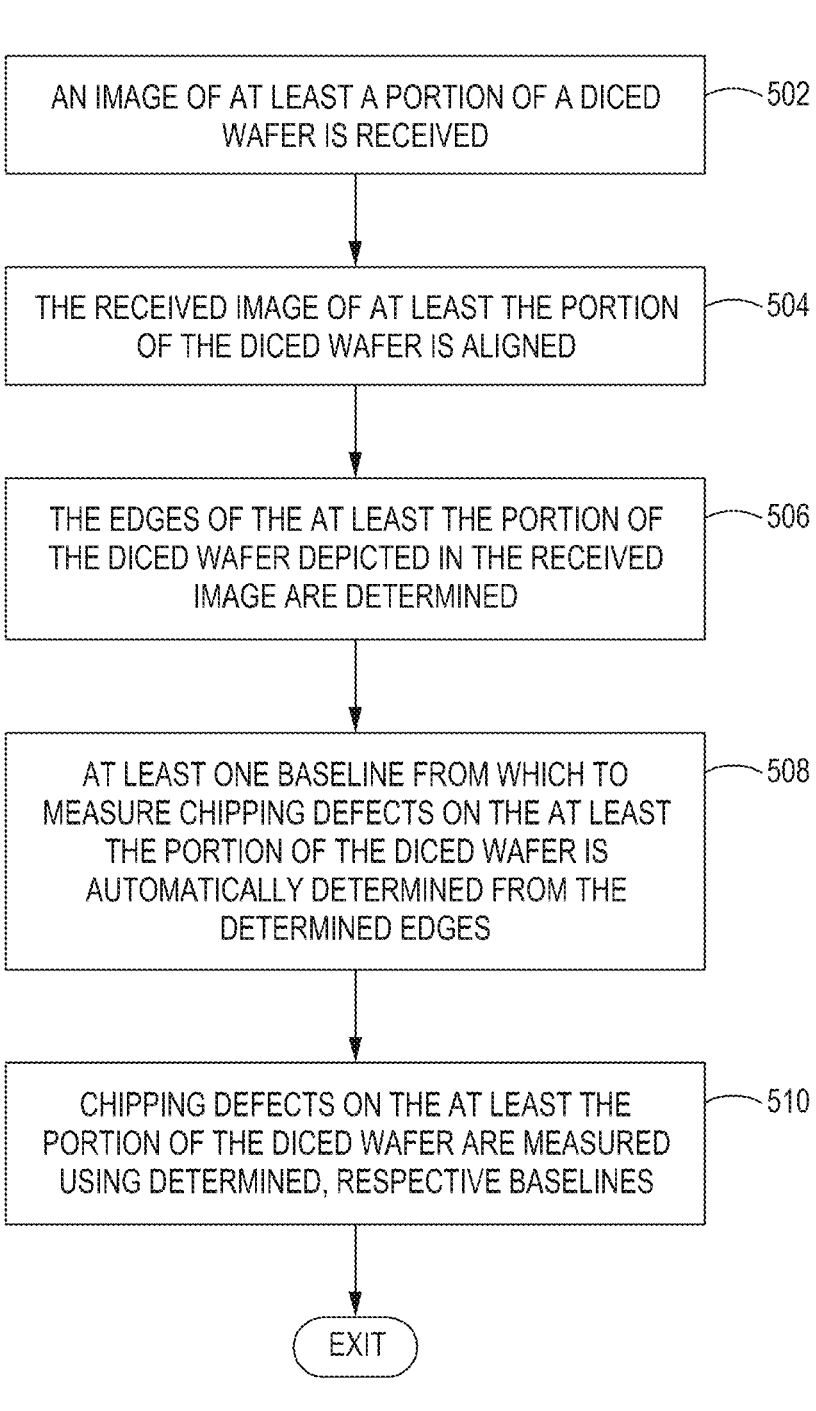

AN IMAGE OF AT LEAST A PORTION OF A DICED WAFER IS RECEIVED ⌐502

THE RECEIVED IMAGE OF AT LEAST THE PORTION OF THE DICED WAFER IS ALIGNED ⌐504

THE EDGES OF THE AT LEAST THE PORTION OF THE DICED WAFER DEPICTED IN THE RECEIVED IMAGE ARE DETERMINED ⌐506

AT LEAST ONE BASELINE FROM WHICH TO MEASURE CHIPPING DEFECTS ON THE AT LEAST THE PORTION OF THE DICED WAFER IS AUTOMATICALLY DETERMINED FROM THE DETERMINED EDGES ⌐508

CHIPPING DEFECTS ON THE AT LEAST THE PORTION OF THE DICED WAFER ARE MEASURED USING DETERMINED, RESPECTIVE BASELINES ⌐510

EXIT

FIGURE 5

PRE-BONDING AUTOMATIC OPTICAL INSPECTION DEFECT CLASSIFICATION

FIELD

Embodiments of the present principles generally relate to detecting and quantifying chipping defects in diced wafers and in particular to the automatic optical inspection of diced wafers to automatically detect and quantify chipping defects on wafers caused by, for example, a dicing process.

BACKGROUND

In the context of manufacturing integrated circuits, wafer dicing is the process by which dies are separated from a wafer of semiconductor following the processing of the wafer. The dicing process can involve scribing and breaking, mechanical sawing and other forms of cutting. However, in some instances, during the dicing process, chipping can occur on the wafer. That is, the cutting/removal of wafer material via abrasive force can cause chipping to occur at the groove edges of the wafer because wafer material is typically brittle.

There currently exist manual processes for detecting and measuring the chipping defects of a wafer. For example, in some instances a process engineer can implement an image capture device, such as an optical profiler tool, which can focus on an area of a diced wafer (i.e., a quadrant of the diced wafer) with great precision. Using the optical tool, the process engineer can draw a line of measurement to evaluate any chipping deviations across each section of the quadrant of the wafer. Such manual measurement of the chipping deviations, however, is a cumbersome process and is error prone due to human perspective, i.e., the measurement line is drawn from the engineer's point of view.

What is needed is a process for the automatic optical inspection of diced wafers to automatically detect and quantify chipping defects on wafers.

SUMMARY

Methods, apparatuses and systems for the automatic detection and measurement of chipping defects on diced wafers are provided herein.

In some embodiments a method for the automatic detection and measurement of chipping defects on diced wafers includes receiving an image of at least a portion of a diced wafer, aligning the received image of the at least the portion of the diced wafer, determining edges of the at least the portion of the diced wafer depicted in the aligned, received image, automatically determining at least one baseline from which to measure chipping defects on the at least the portion of the diced wafer from the determined edges, and measuring chipping defects on the at least the portion of the diced wafer using at least one determined, respective baseline.

In some embodiments the method can further include aligning the received image along a vertical axis. In some embodiments, the method can further include aligning the received image along a horizontal axis.

In some embodiments, the method can further include determining a reference axis line, and aligning the received image along the determined, reference axis line.

In some embodiments, the method can further include measuring chipping defects as a distance from the determined respective baseline to an end of a chipping defect.

In some embodiments, the method can further include applying a machine learning model to measured chipping defects to determine if a critical failure exists on the diced wafer. In some embodiments, the machine learning model is trained to recognize measured chipping defects that result in a critical failure of the diced wafer.

In some embodiments, an apparatus for the automatic detection and measurement of chipping defects on diced wafers includes a processor and a memory coupled to the processor. In some embodiments, the memory has stored therein at least one of programs or instructions executable by the processor to configure the apparatus to receive an image of at least a portion of a diced wafer, align the received image of the at least the portion of the diced wafer, determine edges of the at least the portion of the diced wafer depicted in the aligned, received image, automatically determine at least one baseline from which to measure chipping defects on the at least the portion of the diced wafer from the determined edges, and measure chipping defects on the at least the portion of the diced wafer using the at least one determined baseline.

In some embodiments, the apparatus is configured to align the received image along at least one of a vertical axis or a horizontal axis.

In some embodiments, the apparatus is further configured to determine a reference axis line, and align the received image along the determined, reference axis line.

In some embodiments, the apparatus is configured to measure chipping defects as a distance from the determined respective baseline to an end of a chipping defect.

In some embodiments, the apparatus is further configured to apply a machine learning model to measured chipping defects to determine if a critical failure exists on the diced wafer. In such embodiments, the machine learning model is trained to recognize measured chipping defects that result in a critical failure of the diced wafer.

In some embodiments, a system for the automatic detection and measurement of chipping defects on diced wafers includes an image capture device for capturing images of at least a portion of a diced wafer, and an apparatus including a processor and a memory. In some embodiments, the memory has stored therein at least one program, the at least one program including instructions which, when executed by the processor, cause the system to perform a method including capturing an image of at least a portion of a diced wafer using the image capture device, and aligning the captured image of the at least the portion of the diced wafer, determining edges of the at least the portion of the diced wafer depicted in the aligned, received image, automatically determining at least one baseline from which to measure chipping defects on the at least the portion of the diced wafer from the determined edges, and measuring chipping defects on the at least the portion of the diced wafer using at least one determined, respective baseline, using the apparatus.

In some embodiments, the method performed by the system further includes aligning captured images along at least one of a vertical axis or a horizontal axis.

In some embodiments, the method performed by the system further includes determining a reference axis line, and aligning the captured images along the determined, reference axis line.

In some embodiments, the method performed by the system further includes measuring chipping defects as a distance from the determined respective baseline to an end of a chipping defect.

In some embodiments, the method performed by the system further includes applying a machine learning model to measured chipping defects to determine if a critical failure exists on the diced wafer. In such embodiments, the machine learning model is trained to recognize measured chipping defects that result in a critical failure of the diced wafer Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIG. 5 depicts a flow diagram of a method for the automatic detection and measurement of chipping defects on diced wafers in accordance with an embodiment of the present principles.

Figure 1:
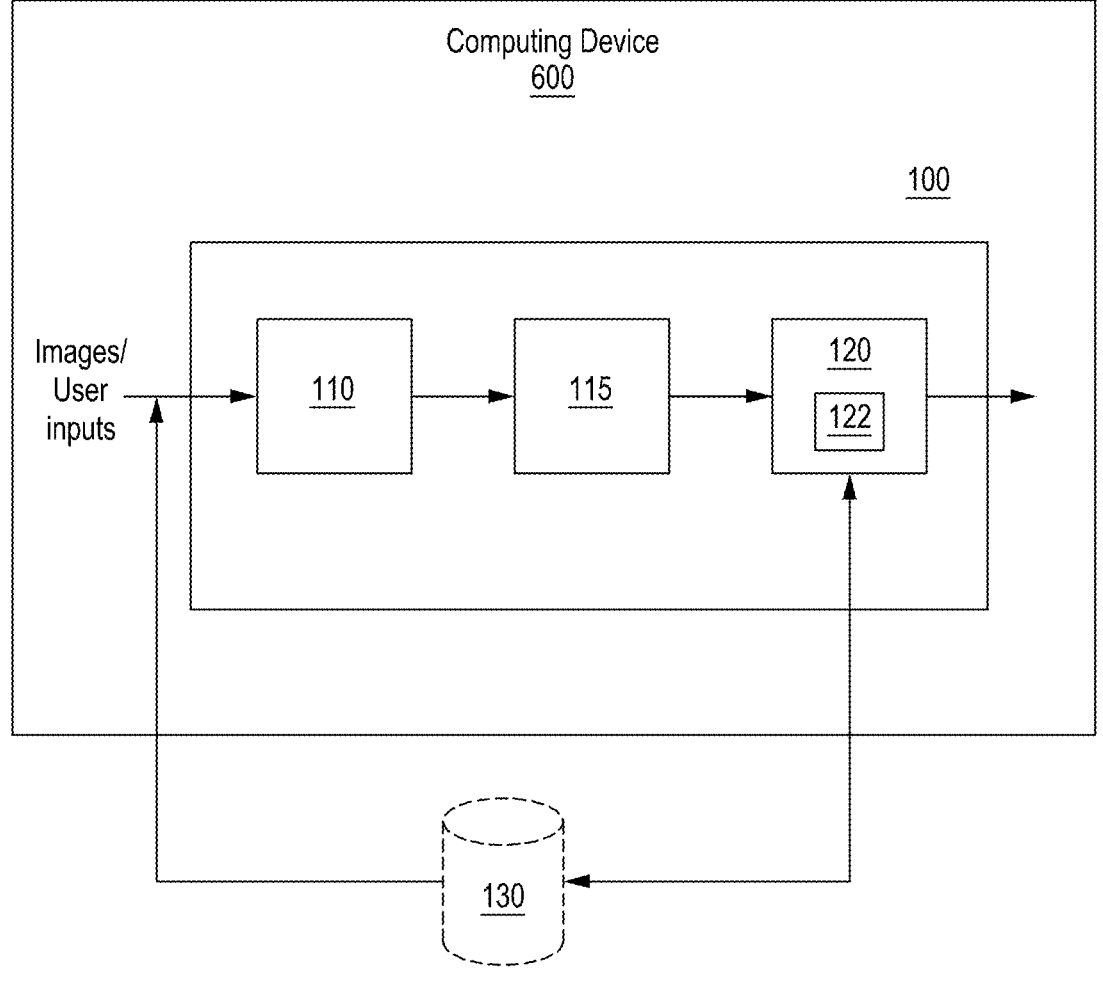
FIG. 1 depicts a high-level block diagram of a wafer chipping inspection system in accordance with an embodiment of the present principles.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

The following detailed description describes techniques (e.g., methods, apparatuses, and systems) for the automatic detection and measurement of chipping defects on diced wafers. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles are described herein with respect to automatically detecting and measuring specific wafer chipping defects caused by the slicing of wafers, embodiments of the present principles can be applied to automatically detect and measure substantially any wafer defects caused by any means.

Throughout this disclosure the terms machine learning (ML) model, machine learning model/algorithm and the like, are used interchangeably to describe an ML process that can be trained to identify chipping defects in a diced wafer(s)/wafer portions that can lead to critical failures of the diced wafer(s)/wafer portions.

Embodiments of the present principles enable the automatic detection and measurement of chipping defects introduced, for example, introduced during a dicing process applied to wafers, with consistency, repeatability and efficiency. In accordance with embodiments of the present principles, a process/algorithm of the present principles is able to prepare the wafer for measurement and enable assisted measurements to quantify and qualify chipping defects on wafers. For example, in some embodiments, in a first step, the algorithm aligns an image of a diced wafers, in a second step the algorithm performs edge detection and in a third step, the algorithm performs defect measurements of the image of the wafers.

FIG. 1 depicts a high-level block diagram of a wafer chipping inspection system 100 in accordance with an embodiment of the present principles. In the embodiment of FIG. 1, the wafer chipping inspection system 100 illustratively includes an alignment module 110, an edge detection module 115, and a chipping measurement module 120. In the embodiment of the wafer chipping inspection system 100 of FIG. 1, the chipping measurement module 120 includes an optional machine learning model/algorithm. Although in the embodiment of the wafer chipping inspection system 100 FIG. 1 the alignment module 110, the edge detection module 115, and the chipping measurement module 120 are depicted as three (3) separate modules for ease of description, in alternate embodiments of the present principles, the alignment module 110, the edge detection module 115, and the chipping measurement module 120 can comprise a single or at least one module. The wafer defect detection and classification system 100 of FIG. 1 further illustratively includes an optional storage device 130.

As depicted in FIG. 1, embodiments of a wafer chipping inspection system of the present principles, such as the wafer chipping inspection system 100 of FIG. 1, can be implemented via a computing device 600 (described in greater detail below) in accordance with the present principles. Although in the embodiment of the wafer chipping inspection system 100 of FIG. 1 (and with reference to FIG. 6), the computing device 600 is depicted as a general-purpose computer, in some embodiments of the present principles a computing device of the present principles can be part of an optical tool (e.g., an optical profiler tool) capable of capturing images of a diced wafer(s).

In the wafer chipping inspection system 100 of FIG. 1, the alignment module 110 can receive data including images of a wafer(s) having been diced, which include images of at least the edges of the diced wafer(s). In some embodiments, such image data can be received from/retrieved from the optional storage device 130. Alternatively or in addition, a wafer chipping inspection system of the present principles, such as the wafer chipping inspection system 100 of FIG. 1, can be part of an optical tool (e.g., an optical profiler tool) capable of capturing images of a diced wafer(s), and can receive data related to the captured images, or the images of such a diced wafer(s) from the optical tool (not shown). Even further, alternatively or in addition, a wafer chipping inspection system of the present principles can receive data including images of a wafer(s) having been diced, from a user of a wafer chipping inspection system of the present principles via, for example, an input device of the computing device 600.

Figure 2:
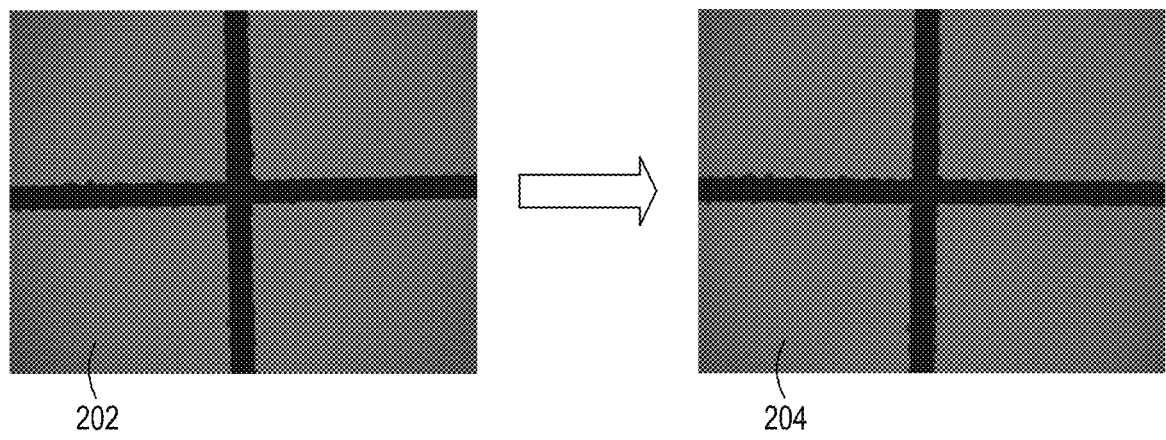
FIG. 2 depicts two images of a quadrant of a diced wafer on which an embodiment of wafer chipping inspection system of the present principles can be applied in accordance with an embodiment of the present principles.

The received image(s) of the diced wafer is/are aligned by the alignment module 110. For example, FIG. 2 depicts two images of a quadrant of a diced wafer on which an embodiment of wafer chipping inspection system of the present principles can be applied in accordance with an embodiment of the present principles. In FIG. 2, the first image 202 depicts a pre-aligned image of a quadrant of the diced wafer. The second image 204 of FIG. 2 depicts the image of the quadrant of the diced wafer having been vertically aligned by the alignment module 110. In the embodiment of FIG. 2, the image 204 of the quadrant of the diced wafer was aligned in the vertical direction/axis by the alignment module 110 by rotating the image 204.

Although in the embodiment of FIG. 2, the images 202, 204 represent images of a quadrant of the diced wafer, in alternate embodiments, images received by the alignment module 110 can represent images of a vertically diced wafer portion. In such embodiments, an alignment module of the present principles can align the images of the vertically diced wafer portion in the vertical direction/axis. In some embodiments, images received by the alignment module 110 can represent images of a horizontally diced wafer portion. In such embodiments, an alignment module of the present principles can align the images of the horizontally diced wafer portion in the horizontal direction/axis. In some embodiments and as depicted in the embodiment of FIG. 2, images received by the alignment module 110 can represent images of a quadrant of a wafer portion having been diced vertically and horizontally. In such embodiments, an alignment module of the present principles can align the images of the horizontally diced wafer portion in the horizontal direction/axis or in the vertical direction/axis or in a combination of both, the vertical and the horizontal direction/axis. For example, in some embodiments an image rotation alignment process can be used by an alignment module of the present principles to align the images. In such embodiments, an average can be determined along a horizontal and/or vertical edge of diced wafer portions to determine a reference axis line, which can be used to rotate an image such that the reference axis line is parallel to the horizontal axis or vertical axis. In such a manner, the rotated image can be corrected along a relevant axis for further measurement processes.

Figure 3:
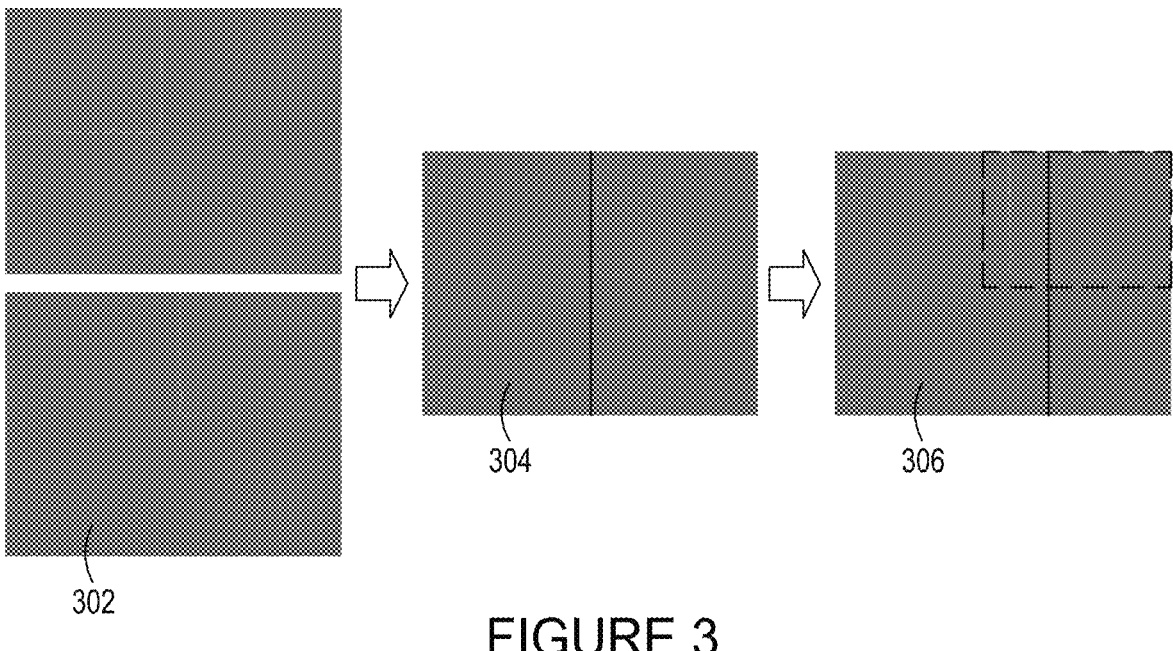
FIG. 3 depicts an embodiment of an edge detection process of an edge detection module of the present principles in accordance with an embodiment of the present principles.

Data of the aligned image(s) from the alignment module 110 are communicated to the edge detection module 120. The edge detection module 115 processes the data from the alignment module 110 to determine the edges of the portions of the diced wafer. For example, FIG. 3 depicts an embodiment of an edge detection process of an edge detection module of the present principles, such as the edge detection module 115 of the wafer chipping inspection system 100 of FIG. 1 in accordance with an embodiment of the present principles. In the embodiment of FIG. 3, edges are determined for the quadrant portions of the diced wafer depicted in FIG. 2 as quadrant pairs, and specifically in FIG. 3, a horizontal edge is determined for the two left quadrants of the diced wafer of FIG. 2. As depicted in the first image 302 of FIG. 3, in some embodiments of the present principles, the edges are determined pairwise for each quadrant of a diced wafer. For example, in the embodiment of FIG. 3 and as depicted in the second image 304, a central reference line between two quadrant images of a diced waver can be determined by analyzing adjacent quadrants. In the embodiment of FIG. 3 an edge detection process can be used to detect image edges, such as in, for example, the third image 306. For example, embodiments of the present principles can use relevant edge detection gradient image processing operations, such as Canny Edge which depicts the luminosity variation due to chipping, to extract the gradients in an image. Such techniques assist in detecting image borders/ edges using existing chipping.

The edge detection process of an edge detection module of the present principles can continue until the edges of all diced wafer portions depicted in an image are determined. For example and in the embodiment of FIG. 3, the edge detection process of the edge detection module 115 can continue until the horizontal edge is determined for the two right quadrants of the diced wafer of FIG. 2, and the vertical edges are determined for the two top quadrants of the diced wafer and for the two bottom quadrants of the diced wafer of the example of FIG. 2.

The edge information determined by an edge detection module of the present principles, such as the edge detection module 115 of the wafer chipping inspection system 100 of FIG. 1, is communicated to a chipping measurement module of the present principles, such the chipping measurement module 120 of the wafer chipping inspection system 100 of FIG. 1. The chipping measurement module 120 uses the edge information to establish a measurement baseline for the diced wafer sections for which the edge(s) was/were determined. That is, once a baseline is determined from the determined edge information for each portion of the diced wafer (i.e., each quadrant of the diced wafer), the measurement module 120 can measure a distance between the baseline and an end of any chipping at several locations in a diced wafer portion to determine chipping information for that portion of the diced wafer, such as a mean chipping value, an average chipping value, a maximum chipping value, and the like.

Figure 4:
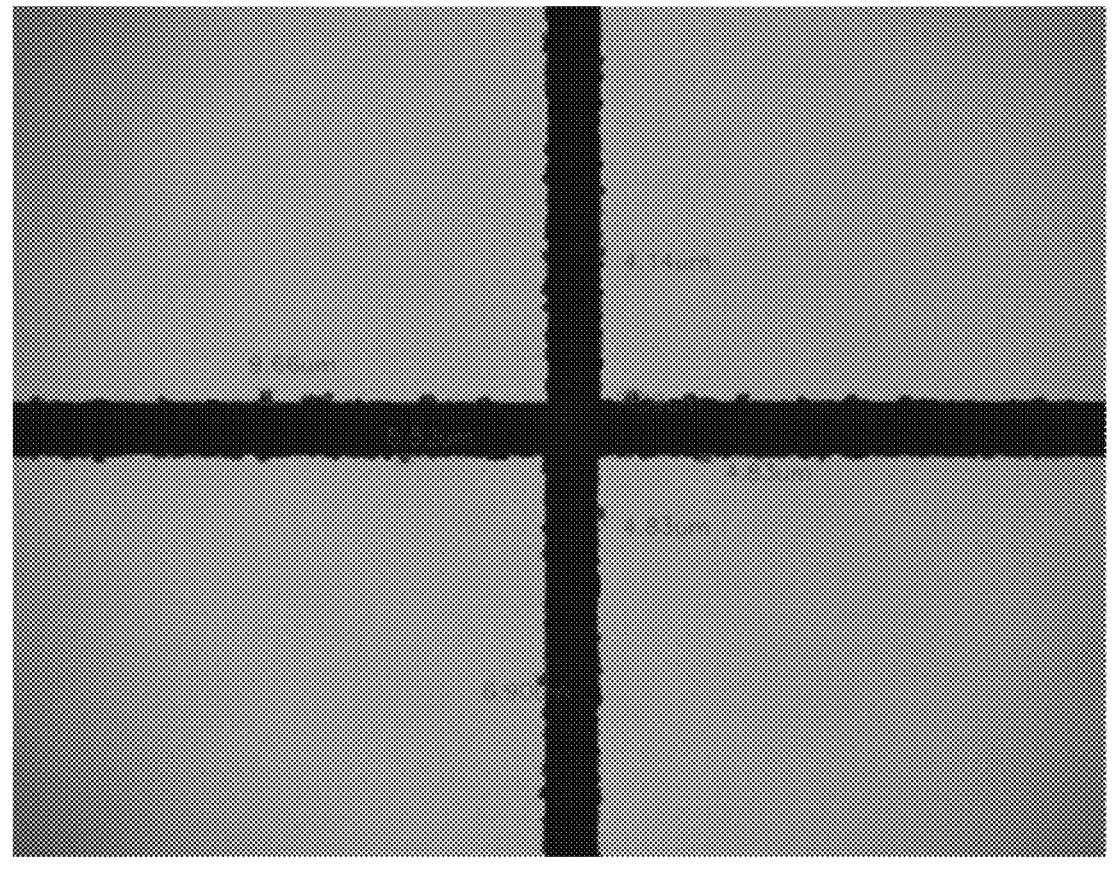
FIG. 4 depicts a pictorial representation of chipping measurements made on quadrants of a diced wafer by a measurement module of the present principles in accordance with an embodiment of the present principles.

For example, FIG. 4 depicts a pictorial representation of chipping measurements made on quadrants of a diced wafer by a measurement module of the present principles, such as the measurement module 120 of the wafer chipping inspection system 100 of FIG. 1, in accordance with an embodiment of the present principles. As depicted in the embodiment of FIG. 4, the measurement module measured a distance between a determined, respective baseline $402_1$-$402_8$ and the end of several chips $407_1$-$407_7$ at several locations in each of the quadrants $404_1$-$404_4$ of the diced wafer.

In some embodiments of the present principles, the chipping measurement information determined by a measurement module of the present principles can be used to determine if a wafer contains a critical failure. Such information can be used by a wafer chipping inspection system of the present principles, such as the wafer chipping inspection system 100 of FIG. 1 to determine if a wafer should be scrapped or if the wafer should be allowed to continue in a wafer processing system.

For example, as depicted in the wafer chipping inspection system 100 of FIG. 1, in some embodiments the measurement module 120 can include an optional machine learning model 122. In accordance with the present principles, the machine learning model 122 can be trained to identify chipping measurements, alone or in any combinations of chipping measurements, that can lead to critical failures of a diced wafer. For example, in some embodiments, historical data regarding chipping measurements, alone or in combination, that lead to critical failures for diced wafers of all types can be used to train the machine learning module 122 to identify chipping measurements on diced wafers that can lead to critical failures of a diced wafer.

In some embodiments, a model/algorithm of the present principles, such as the machine learning model/algorithm 122, can include a multi-layer neural network comprising nodes that are trained to have specific weights and biases. In some embodiments, the machine learning model/algorithm 122 employs artificial intelligence techniques or machine learning techniques to analyze received data images including wafer defects. In some embodiments in accordance with the present principles, suitable machine learning techniques can be applied to learn commonalities in sequential application programs and for determining from the machine learning techniques at what level sequential application programs can be canonicalized. In some embodiments, machine learning techniques that can be applied to learn commonalities in sequential application programs can include, but are not limited to, regression methods, ensemble methods, or neural networks and deep learning such as 'Se2oSeq' Recurrent Neural Network (RNNs)/Long Short-Term Memory (LSTM) networks, Convolution Neural Networks (CNNs), graph neural networks applied to the abstract syntax trees corresponding to the sequential program application, and the like. In some embodiments a supervised machine learning (ML) classifier/algorithm could be used such as, but not limited to, Multilayer Perceptron, Random Forest, Naive Bayes, Support Vector Machine, Logistic Regression and the like. In addition, in some embodiments, the ML classifier/algorithm of the present principles can implement at least one of a sliding window or sequence-based techniques to analyze data.

The machine learning model/algorithm 122 can be trained using a plurality (e.g., hundreds, thousands, etc.) of instances of diced wafer critical failure data in which the training data comprises data related to critical failures of diced wafers caused by chipping defects on the diced wafer portions to train a machine learning model/algorithm of the present principles to recognize/detect and distinguish between various types of chipping defects on diced wafers that lead to critical failures.

FIG. 5 depicts a flow diagram of a method 500 for the automatic detection and measurement of chipping defects on diced wafers in accordance with an embodiment of the present principles. The method can begin at 502 during which an image of at least a portion of a diced wafer is received. The method 500 can proceed to 504.

At 504, the received image of at least the portion of the diced wafer is aligned. The method 500 can proceed to 506.

At 506, the edges of the at least the portion of the diced wafer depicted in the received image are determined. The method can proceed to 508.

At 508, at least one baseline from which to measure chipping defects on the at least the portion of the diced wafer is automatically determined from the determined edges. The method can proceed to 510.

At 510, chipping defects on the at least the portion of the diced wafer are measured using determined, respective baselines. The method 500 can be exited.

In some embodiments of the present principles, the method 500 can further include applying a machine learning model to the determined chipping measurements to determine if the diced wafer contains a critical failure.

As depicted in FIG. 1, embodiments of a wafer chipping inspection system of the present principles, such as the wafer chipping inspection system 100 of FIG. 1, can be implemented in a computing device 600 in accordance with the present principles. That is, in some embodiments, wafer image data and the like can be communicated to a wafer chipping inspection system of the present principles using the computing device 600 via, for example, any input/output means associated with the computing device 600. Chipping measurement data associated with a wafer chipping inspection system of the present principles can be presented to a user using an output device of the computing device 600, such as a display, a printer or any other form of output device.

Figure 6:
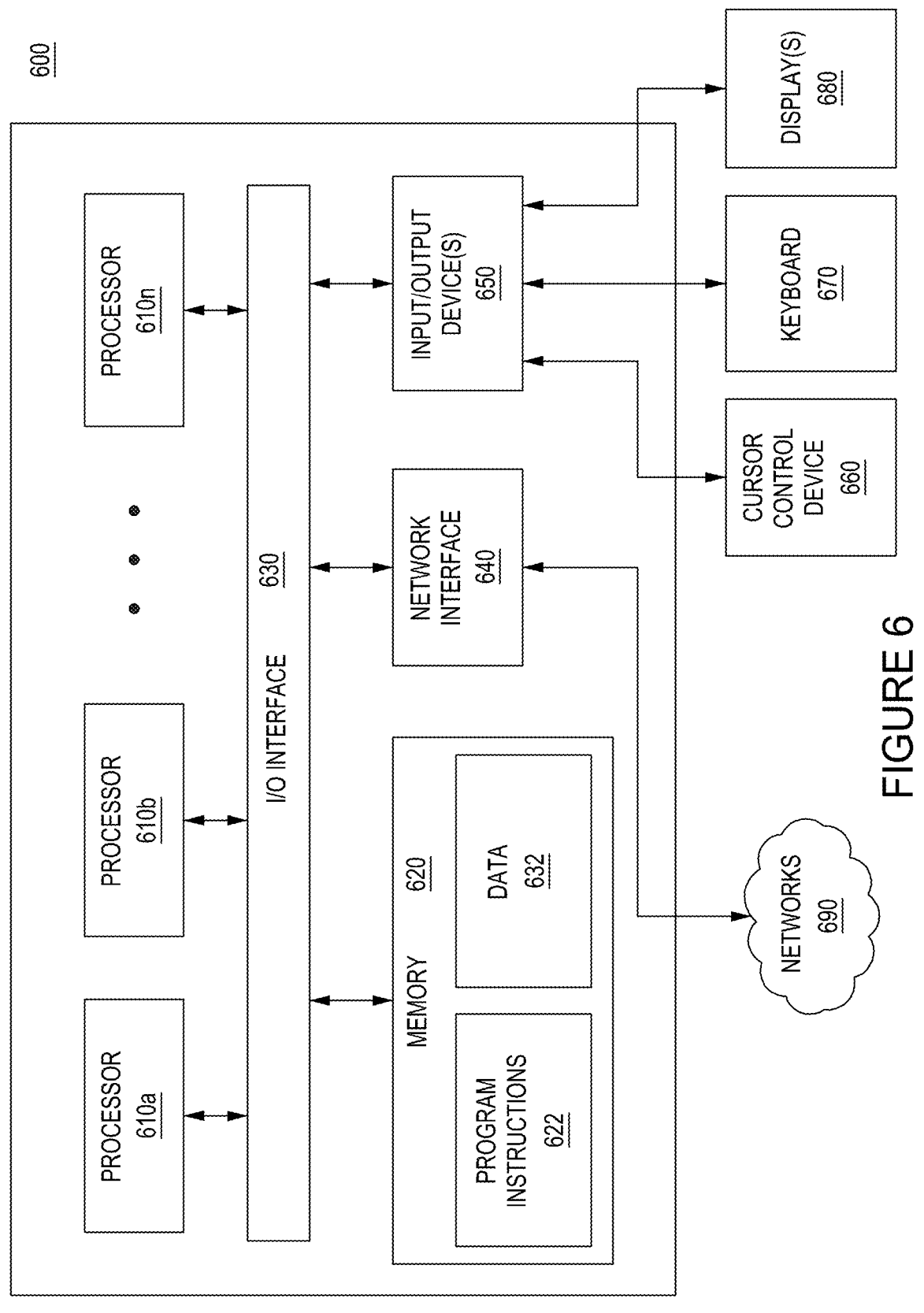
FIG. 6 depicts a high-level block diagram of a computing device suitable for use with embodiments of a wafer chipping inspection system in accordance with the present principles.

For example, FIG. 6 depicts a high-level block diagram of a computing device 600 suitable for use with embodiments of a wafer chipping inspection system in accordance with the present principles, such as the wafer chipping inspection system 100 of FIG. 1. In some embodiments, the computing device 600 can be configured to implement methods of the present principles as processor-executable executable program instructions 622 (e.g., program instructions executable by processor(s) 610) in various embodiments.

In the embodiment of FIG. 6, the computing device 600 includes one or more processors 610a-610n coupled to a system memory 620 via an input/output (I/O) interface 630. The computing device 600 further includes a network interface 640 coupled to I/O interface 630, and one or more input/output devices 650, such as cursor control device 660, keyboard 670, and display(s) 680. In various embodiments, a user interface can be generated and displayed on display 680. In some cases, it is contemplated that embodiments can be implemented using a single instance of computing device 600, while in other embodiments multiple such systems, or multiple nodes making up the computing device 600, can be configured to host different portions or instances of various embodiments. For example, in one embodiment some elements can be implemented via one or more nodes of the computing device 600 that are distinct from those nodes implementing other elements. In another example, multiple nodes may implement the computing device 600 in a distributed manner.

In different embodiments, the computing device 600 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 600 can be a uniprocessor system including one processor 610, or a multiprocessor system including several processors 610 (e.g., two, four, eight, or another suitable number). Processors 610 can be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 can be configured to store program instructions 622 and/or data 632 accessible by processor 610. In various embodiments, system memory 620 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 620. In other embodiments, program instructions and/or data can be received, sent or stored upon different types of computer-accessible media or on similar media separate from system memory 620 or computing device 600.

In one embodiment, I/O interface 630 can be configured to coordinate I/O traffic between processor 610, system memory 620, and any peripheral devices in the device, including network interface 640 or other peripheral interfaces, such as input/output devices 650. In some embodiments, I/O interface 630 can perform any necessary protocol, timing or other data transformations to convert data signals from one component (e.g., system memory 620) into a format suitable for use by another component (e.g., processor 610). In some embodiments, I/O interface 630 can include support for devices attached through various types of peripheral buses, such as a variant of the Peripheral Component Interconnect (PCI) bus standard or the Universal Serial Bus (USB) standard, for example. In some embodiments, the function of I/O interface 630 can be split into two or more separate components, such as a north bridge and a south bridge, for example. Also, in some embodiments some or all of the functionality of I/O interface 630, such as an interface to system memory 620, can be incorporated directly into processor 610.

Network interface 640 can be configured to allow data to be exchanged between the computing device 600 and other devices attached to a network (e.g., network 690), such as one or more external systems or between nodes of the computing device 600. In various embodiments, network 690 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 650 can, in some embodiments, include one or more display terminals, keyboards, keypads, touchpads, scanning devices, voice or optical recognition devices, or any other devices suitable for entering or accessing data by one or more computer systems. Multiple input/output devices 650 can be present in computer system or can be distributed on various nodes of the computing device 600. In some embodiments, similar input/output devices can be separate from the computing device 600 and can interact with one or more nodes of the computing device 600 through a wired or wireless connection, such as over network interface 640.

Those skilled in the art will appreciate that the computing device 600 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 600 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 600 can communicate with other computing devices based on various computer communication protocols such a Wi-Fi, Bluetooth.RTM. (and/or other standards for exchanging data over short distances includes protocols using short-wavelength radio transmissions), USB, Ethernet, cellular, an ultrasonic local area communication protocol, etc. The computing device 600 can further include a web browser.

Although the computing device 600 is depicted as a general-purpose computer, the computing device 600 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 7:
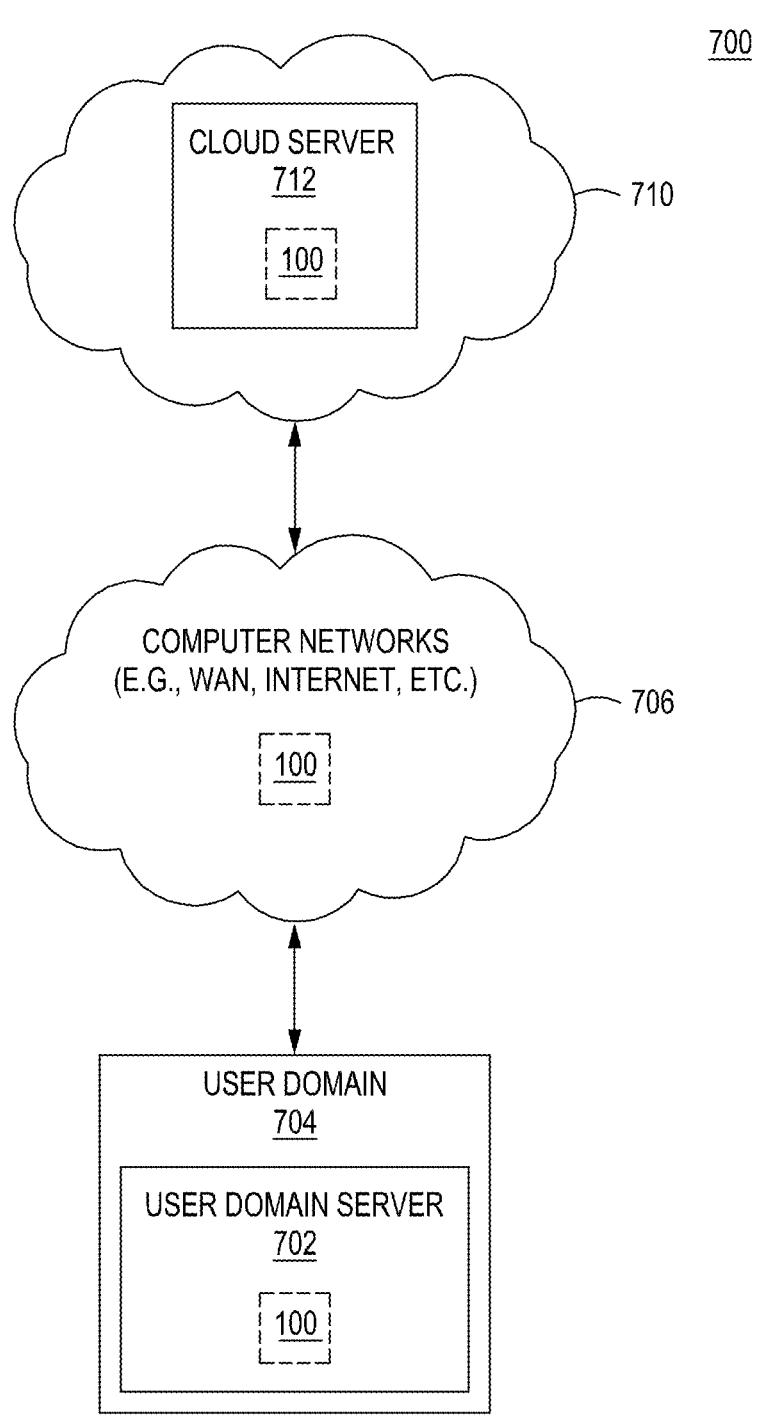
FIG. 7 depicts a high-level block diagram of a network in which embodiments of a wafer chipping inspection system of the present principles can be applied in accordance with an embodiment of the present principles.

FIG. 7 depicts a high-level block diagram of a network in which embodiments of a wafer chipping inspection system of the present principles, such as the wafer chipping inspection system 100 of FIG. 1, can be applied. The network environment 700 of FIG. 7 illustratively comprises a user domain 702 including a user domain server/computing device 704. The network environment 700 of FIG. 7 further comprises computer networks 706, and a cloud environment 710 including a cloud server/computing device 712.

In the network environment 700 of FIG. 7, a wafer chipping inspection system in accordance with the present principles, such as wafer chipping inspection system of FIG. 1, can be included in at least one of the user domain server/computing device 704, the computer networks 706, and the cloud server/computing device 712. That is, in some embodiments, a user can use a local server/computing device (e.g., the user domain server/computing device 704) to detect and measure chipping defects in diced wafers in accordance with the present principles.

In some embodiments, a user can implement a system for detecting and measuring chipping defects in diced wafers in the computer networks 706 in accordance with the present principles. Alternatively or in addition, in some embodiments, a user can implement a system for detecting and measuring chipping defects in diced wafers in the cloud server/computing device 712 of the cloud environment 710 to provide container forensics in accordance with the present principles. For example, in some embodiments it can be advantageous to perform processing functions of the present principles in the cloud environment 710 to take advantage of the processing capabilities and storage capabilities of the cloud environment 710. In some embodiments in accordance with the present principles, a system for detecting and measuring chipping defects in diced wafers can be located in a single and/or multiple locations/servers/computers to perform all or portions of the herein described functionalities of a system in accordance with the present principles. For example, a wafer chipping inspection system of the present principles can be located in one or more than one of the user domain 702, the computer network environment 706, and the cloud environment 710 for detecting and measuring chipping defects in diced wafers in accordance with the present principles.

Those skilled in the art will appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 600 can be transmitted to the computing device 600 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

While the foregoing is directed to embodiments of the present disclosure, other and further embodiments of the disclosure may be devised without departing from the basic scope thereof.

The invention claimed is:

1. A method for the automatic detection and measurement of chipping defects on diced wafers, comprising:
 receiving an image of at least a portion of a diced wafer;
 aligning the received image of the at least the portion of the diced wafer;
 determining edges of the at least the portion of the diced wafer depicted in the aligned, received image;
 automatically determining at least one baseline from which to measure chipping defects on the at least the portion of the diced wafer from the determined edges;
 measuring chipping defects on the at least the portion of the diced wafer using at least one determined, respective baseline; and
 applying a machine learning model to measured chipping defects to determine if a critical failure exists on the diced wafer.

2. The method of claim 1, further comprising:
 aligning the received image along a vertical axis.

3. The method of claim 1, further comprising:
 aligning the received image along a horizontal axis.

4. The method of claim 1, further comprising:
 determining a reference axis line; and
 aligning the received image along the determined, reference axis line.

5. The method of claim 1, further comprising:

measuring chipping defects as a distance from the determined respective baseline to an end of a chipping defect.

6. The method of claim 1 wherein the machine learning model is trained to recognize measured chipping defects that result in a critical failure of the diced wafer.

7. An apparatus for the automatic detection and measurement of chipping defects on diced wafers, comprising:

a processor; and a memory coupled to the processor, the memory having stored therein at least one of programs or instructions executable by the processor to configure the apparatus to:

receive an image of at least a portion of a diced wafer;

align the received image of the at least the portion of the diced wafer;

determine edges of the at least the portion of the diced wafer depicted in the aligned, received image;

automatically determine at least one baseline from which to measure chipping defects on the at least the portion of the diced wafer from the determined edges;

measure chipping defects on the at least the portion of the diced wafer using the at least one determined baseline; and apply a machine learning model to measured chipping defects to determine if a critical failure exists on the diced wafer.

8. The apparatus of claim 7, wherein the received image is aligned along a vertical axis.

9. The apparatus of claim 7 wherein the received image is aligned along a horizontal axis.

10. The apparatus of claim 8, wherein the apparatus is further configured to:

determine a reference axis line; and align the received image along the determined, reference axis line.

11. The apparatus of claim 7, wherein chipping defects are measured as a distance from the determined respective baseline to an end of a chipping defect.

12. The apparatus of claim 7, wherein the machine learning model is trained to recognize measured chipping defects that result in a critical failure of the diced wafer.

13. A system for the automatic detection and measurement of chipping defects on diced wafers, comprising:

an image capture device for capturing images of at least a portion of a diced wafer; and an apparatus comprising:

a processor; and a memory having stored therein at least one program, the at least one program including instructions which, when executed by the processor, cause the system to perform a method, comprising;

capturing an image of at least a portion of a diced wafer;

aligning the captured image of the at least the portion of the diced wafer;

determining edges of the at least the portion of the diced wafer depicted in the aligned, received image;

automatically determining at least one baseline from which to measure chipping defects on the at least the portion of the diced wafer from the determined edges;

measuring chipping defects on the at least the portion of the diced wafer using at least one determined, respective baseline; and apply a machine learning model to measured chipping defects to determine if a critical failure exists on the diced wafer.

14. The system of claim 13, wherein the method further comprises:

aligning captured images along at least one of a vertical axis or a horizontal axis.

15. The system of claim 13, wherein the method further comprises:

determining a reference axis line; and aligning the captured images along the determined, reference axis line.

16. The system of claim 13, wherein the method further comprises:

Measuring chipping defects as a distance from the determined respective baseline to an end of a chipping defect.

17. The system of claim 13, wherein the machine learning model is trained to recognize measured chipping defects that result in a critical failure of the diced wafer.

* * * * *